United States Patent
Ahn et al.

(10) Patent No.: US 9,407,393 B2
(45) Date of Patent: Aug. 2, 2016

(54) METHOD FOR RECEIVING DOWNLINK DATA AND WIRELESS DEVICE USING SAME

(71) Applicant: LG ELECTRONICS INC., Seoul (KR)

(72) Inventors: Joon Kui Ahn, Anyang-si (KR); Suck Chel Yang, Anyang-si (KR); Dong Youn Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 62 days.

(21) Appl. No.: 14/359,551

(22) PCT Filed: Nov. 21, 2012

(86) PCT No.: PCT/KR2012/009854
§ 371 (c)(1),
(2) Date: May 20, 2014

(87) PCT Pub. No.: WO2013/077621
PCT Pub. Date: May 30, 2013

(65) Prior Publication Data
US 2014/0321424 A1    Oct. 30, 2014

Related U.S. Application Data

(60) Provisional application No. 61/562,423, filed on Nov. 21, 2011.

(51) Int. Cl.
*H04W 4/00* (2009.01)
*H04J 11/00* (2006.01)
*H04W 56/00* (2009.01)

(52) U.S. Cl.
CPC ........... *H04J 11/0059* (2013.01); *H04W 56/00* (2013.01)

(58) Field of Classification Search
CPC .................................................. H04J 11/0059
USPC ................................................... 370/328–339
See application file for complete search history.

(56) References Cited

U.S. PATENT DOCUMENTS

| 2009/0271680 A1* | 10/2009 | Tanigawa | H04L 1/08 714/748 |
| 2012/0027110 A1* | 2/2012 | Han | H04J 11/0079 375/260 |
| 2014/0161111 A1* | 6/2014 | Kim | H04W 56/0005 370/336 |

FOREIGN PATENT DOCUMENTS

KR    10-2011-0081086 A    7/2011
WO    2007-125406 A2    11/2007
(Continued)

OTHER PUBLICATIONS

NTT DoCoMo: "Test cases for deactivated SCell measurements in fading with no glitch", 3GPP TSG-RAN WG4 meeting #60bis, R4-115293, Oct. 10-14, 2011.

CATT: "Support of multiple timing advances in LTE-A Rel-11 with CA", 3GPP TSG RAN WG1 Meeting #66bis, R1-112946, Oct. 10-14, 2011.

(Continued)

*Primary Examiner* — Iqbal Zaidi
(74) *Attorney, Agent, or Firm* — Dentons US LLP (57) ABSTRACT

The present invention relates to a method for receiving downlink data and a wireless device using same. The wireless device determines a subframe reception timing difference between a first serving cell and a second serving cell, receives a downlink grant through a downlink control channel of the first serving cell, and receives a downlink transmission block through a downlink shared channel of the second serving cell as instructed by the downlink grant. When the subframe reception timing difference is a predetermined value, at least one orthogonal frequency division multiplexing (OFDM) symbol from among a plurality of OFDM symbols is neglected in a subframe where the downlink shared channel is received.

12 Claims, 10 Drawing Sheets

(56) References Cited

FOREIGN PATENT DOCUMENTS

| WO | 2011-050743 | A1 | 5/2011 |
| WO | 2011-099795 | A2 | 8/2011 |

OTHER PUBLICATIONS

LG Electronics: "Discussion on multiple TA for carrier aggregation", 3GPP TSG RAN WG1 #66, R1-112330, Aug. 22-26, 2011.

* cited by examiner

METHOD FOR RECEIVING DOWNLINK DATA AND WIRELESS DEVICE USING SAME

This application is a 35 USC §371 National Stage entry of International Application No. PCT/KR2012/009854, filed Nov. 21, 2012, and claims priority to U.S. Provisional Application No. 61/562,423 filed Nov. 21, 2011, each of which are hereby incorporated by reference in their entirety.

BACKGROUND OF THE INVENTION

1. Field of the Invention

The present invention relates to wireless communications, and more particularly, to a method of receiving downlink data in a wireless communication system, and a wireless device using the method.

2. Related Art $3^{rd}$ generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

As disclosed in 3GPP TS 36.211 V8.7.0 (2009-05) "Evolved Universal Terrestrial Radio Access (E-UTRA); Physical Channels and Modulation (Release 8)", a physical channel of the LTE may be classified into a downlink channel, i.e., a physical downlink shared channel (PDSCH) and a physical downlink control channel (PDCCH), and an uplink channel, i.e., a physical uplink shared channel (PUSCH) and a physical uplink control channel (PUCCH).

To decrease an interference caused by uplink transmission between user equipments (UEs), it is important for a base station (BS) to maintain uplink time alignment of the UEs. The UE may be located in any area in a cell. An uplink signal transmitted by the UE may arrive to the BS at a different time according to the location of the UE. A signal arrival time of a UE located in a cell edge is longer than a signal arrival time of a UE located in a cell center. On the contrary, the signal arrival time of the UE located in the cell center is shorter than the signal arrival time of the UE located in the cell edge.

To decrease the interference between the UEs, the BS needs to perform scheduling so that uplink signals transmitted by the UEs in the cell can be received every time within a boundary. The BS has to properly adjust transmission timing of each UE according to a situation of each UE. Such an adjustment is called an uplink time alignment. A random access process is one of processes for maintaining the uplink time alignment. The UE acquires a time alignment value (or also referred to as a timing advance (TA) through the random access process, and maintains the uplink time alignment by applying the time alignment value.

In addition, a transmit power of the UE needs to be adjusted to mitigate an interference caused by uplink transmission. It is difficult for the BS to receive uplink data if the transmit power of the UE is too low. If the transmit power of the UE is too high, uplink transmission may cause a significant interference to transmission of another UE.

Recently, multiple serving cells are introduced to provide a higher data rate. However, the same time alignment value has been applied to all serving cells under the assumption that serving cells have adjacent frequencies or have similar propagation properties.

A reception timing difference among a plurality of serving cells may be increased greatly when configuring the plurality of serving cells to which different time alignment values are applied.

SUMMARY OF THE INVENTION

The present invention provides a method of receiving downlink data in consideration of a reception timing difference among a plurality of serving cells, and a wireless device using the method.

In an aspect, a method of receiving downlink data in a wireless communication system is provided. The method includes determining, by a wireless device, a subframe reception timing difference between a first serving cell and a second serving cell, receiving, by the wireless device, a downlink grant through a downlink control channel of the first serving cell, and receiving, by the wireless device, a downlink transport block through a downlink shared channel of the second serving cell indicated by the downlink grant. If the subframe reception timing difference is greater than a specific value, at least one orthogonal frequency division multiplexing (OFDM) symbol is ignored among a plurality of OFDM symbols in a subframe in which the downlink shared channel is received.

The ignored OFDM symbol may be a first OFDM symbol among the plurality of OFDM symbols.

The subframe may include a control region and a data region, and the ignored OFDM symbol may be a first OFDM symbol among OFDM symbols included in the data region.

In another aspect, a wireless device for receiving downlink data in a wireless communication system is provided. The wireless device includes a radio frequency (RF) unit configured to transmit and receive a radio signal, and a processor operatively coupled to the RF unit, wherein the processor is configured to determine a subframe reception timing difference between a first serving cell and a second serving cell, receive a downlink grant through a downlink control channel of the first serving cell and receive a downlink transport block through a downlink shared channel of the second serving cell indicated by the downlink grant. If the subframe reception timing difference is greater than a specific value, at least one orthogonal frequency division multiplexing (OFDM) symbol is ignored among a plurality of OFDM symbols in a subframe in which the downlink shared channel is received.

When scheduling is configured among a plurality of cells, a buffering overhead of a wireless device, which is caused by a receiving timing difference, can be decreased.

BRIEF DESCRIPTION OF THE DRAWINGS

FIG. 6 shows an example in which a TA varies among multiple cells in uplink transmission.

DESCRIPTION OF EXEMPLARY EMBODIMENTS

A wireless device may be fixed or mobile, and may be referred to as another terminology, such as a user equipment (UE), a mobile station (MS), a user terminal (UT), a subscriber station (SS), a mobile terminal (MT), etc. A base station (BS) is generally a fixed station that communicates with the wireless device, and may be referred to as another terminology, such as an evolved-NodeB (eNB), a base transceiver system (BTS), an access point, etc.

It is described hereinafter that the present invention is applied based on 3rd generation partnership project (3GPP) long term evolution (LTE) or 3GPP LTE-advanced (LTE-A). This is for exemplary purposes only, and the present invention is also applicable to various wireless communication systems. In the following description, LTE and/or LTE-A are collectively referred to as LTE.

Figure 1:
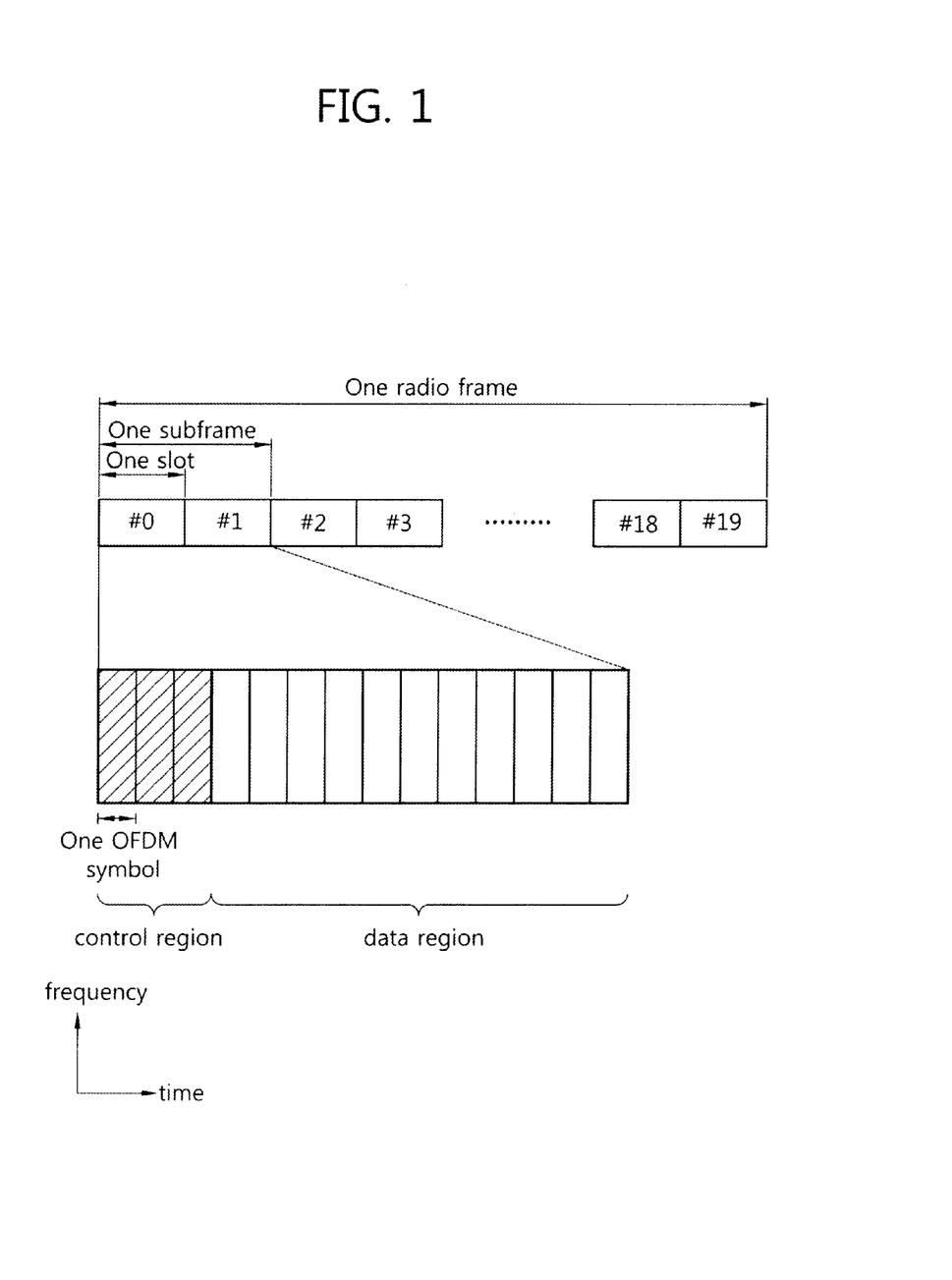
FIG. 1 shows a downlink (DL) radio frame structure in $3^{rd}$ generation partnership project (3GPP) long term evolution (LTE).

FIG. 1 shows a structure of a downlink radio frame in 3GPP LTE. The section 6 of 3GPP TS 36.211 V8.7.0 (2009-05) "Evolved Universal Terrestrial Radio Access (E-UTRA); Physical Channels and Modulation (Release 8)" may be incorporated herein by reference.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.7.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7☐12 resource elements (REs).

A DL subframe is divided into a control region and a data region in the time domain. The control region includes up to first four OFDM symbols of a first slot in the subframe. However, the number of OFDM symbols included in the control region may vary. A physical downlink control channel (PDCCH) and other control channels are allocated to the control region, and a physical downlink shared channel (PDSCH) is allocated to the data region.

As disclosed in 3GPP TS 36.211 V8.7.0, the 3GPP LTE classifies a physical channel into a data channel and a control channel. Examples of the data channel include a physical downlink shared channel (PDSCH) and a physical uplink shared channel (PUSCH). Examples of the control channel include a physical downlink control channel (PDCCH), a physical control format indicator channel (PCFICH), a physical hybrid-ARQ indicator channel (PHICH), and a physical uplink control channel (PUCCH).

The PCFICH transmitted in a first OFDM symbol of the subframe carries a control format indicator (CFI) regarding the number of OFDM symbols (i.e., a size of the control region) used for transmission of control channels in the subframe. The wireless device first receives the CFI on the PCFICH, and thereafter monitors the PDCCH.

Unlike the PDCCH, the PCFICH does not use blind decoding, and is transmitted by using a fixed PCFICH resource of the subframe.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the wireless device is transmitted on the PHICH.

A physical broadcast channel (PBCH) is transmitted in first four OFDM symbols in a second slot of a first subframe of a radio frame. The PBCH carries system information necessary for communication between the wireless device and a BS. The system information transmitted through the PBCH is referred to as a master information block (MIB). In comparison thereto, system information transmitted on the PDCCH is referred to as a system information block (SIB).

Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group, and/or activation of a voice over Internet protocol (VoIP).

The 3GPP LTE/LTE-A uses blind decoding for PDCCH detection. The blind decoding is a scheme in which a desired identifier is de-masked from a cyclic redundancy check (CRC) of a received PDCCH (referred to as a candidate PDCCH) to determine whether the PDCCH is its own control channel by performing CRC error checking.

The BS determines a PDCCH format according to DCI to be transmitted to the UE, attaches a CRC to the DCI, and masks a unique identifier (referred to as a radio network temporary identifier (RNTI)) to the CRC according to an owner or usage of the PDCCH.

A control region in a subframe includes a plurality of control channel elements (CCEs). The CCE is a logical allocation unit used to provide the PDCCH with a coding rate depending on a radio channel state, and corresponds to a plurality of resource element groups (REGs). The REG includes a plurality of resource elements. According to an association relation of the number of CCEs and the coding rate provided by the CCEs, a PDCCH format and the number of bits of an available PDCCH are determined.

One REG includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level.

The BS determines the number of CCEs used in transmission of the PDCCH according to a channel state. For example, a wireless device having a good DL channel state can use one CCE in PDCCH transmission. A wireless device having a poor DL channel state can use 8 CCEs in PDCCH transmission.

A control channel consisting of one or more CCEs performs interleaving on an REG basis, and is mapped to a physical resource after performing cyclic shift based on a cell identifier (ID).

According to 3GPP TS 36.211 V8.7.0, the uplink channel includes a PUSCH, a PUCCH, a sounding reference signal (SRS), and a physical random access channel (PRACH).

The PUCCH supports multiple formats. A PUCCH having a different number of bits per subframe can be used according to a modulation scheme which is dependent on the PUCCH format. The PUCCH format 1 is used for transmission of a scheduling request (SR). The PUCCH formats 1a/1b are used for transmission of an ACK/NACK signal. The PUCCH format 2 is used for transmission of a CQI. The PUCCH formats 2a/2b are used for simultaneous transmission of the CQI and the ACK/NACK signal. When only the ACK/NACK signal is transmitted in a subframe, the PUCCH formats 1a/1b are used. When the SR is transmitted alone, the PUCCH format 1 is used. When the SR and the ACK/NACK are simultaneously transmitted, the PUCCH format 1 is used, and in this transmission, the ACK/NACK signal is modulated by using a resource allocated to the SR.

Now, maintaining of a UL time alignment in 3GPP LTE will be described.

To decrease an interference caused by UL transmission between UEs, it is important for a BS to maintain a UL time alignment of the UEs. The UE may be located in any area in a cell. A UL signal transmitted by the UE may arrive to the BS at a different time according to the location of the UE. A signal arrival time of a UE located in a cell edge is longer than a signal arrival time of a UE located in a cell center. On the contrary, the signal arrival time of the UE located in the cell center is shorter than the signal arrival time of the UE located in the cell edge.

To decrease the interference between the UEs, the BS needs to perform scheduling so that UL signals transmitted by the UEs in the cell can be received every time within a boundary. The BS has to properly adjust transmission timing of each UE according to a situation of each UE. Such an adjustment is called a time alignment maintenance.

A random access procedure is one of methods for managing the time alignment. The UE transmits a random access preamble to the BS. The BS calculates a time alignment value for advancing or delaying transmission timing of the UE on the basis of the received random access preamble. In addition, the BS transmits a random access response including the calculated time alignment value to the UE. The UE updates the transmission timing by using the time alignment value.

In another method, the BS receives a sounding reference signal from the UE periodically or randomly, calculates the time alignment value of the UE by using the sounding reference signal, and reports a MAC control element (CE) to the UE.

The time alignment value is information sent by the BS to the UE to maintain uplink time alignment. A timing alignment command indicates this information.

Since the UE has a mobility in general, the transmission timing of the UE varies depending on a speed, location, or the like of the moving UE. Therefore, the time alignment value received by the UE is preferably valid during a specific time period. For this, a time alignment timer is used.

When the time alignment is updated after receiving the time alignment value from the BS, the UE starts or restarts the time alignment timer. The UE can perform UL transmission only when the time alignment timer is running. A value of the time alignment timer may be reported by the BS to the UE by using system information or an RRC message such as a radio bearer reconfiguration message.

When the time alignment timer expires or when the time alignment timer does not run, the UE does not transmit any uplink signal except for the random access preamble under the assumption that time alignment is not achieved between the BS and the UE.

Figure 2:
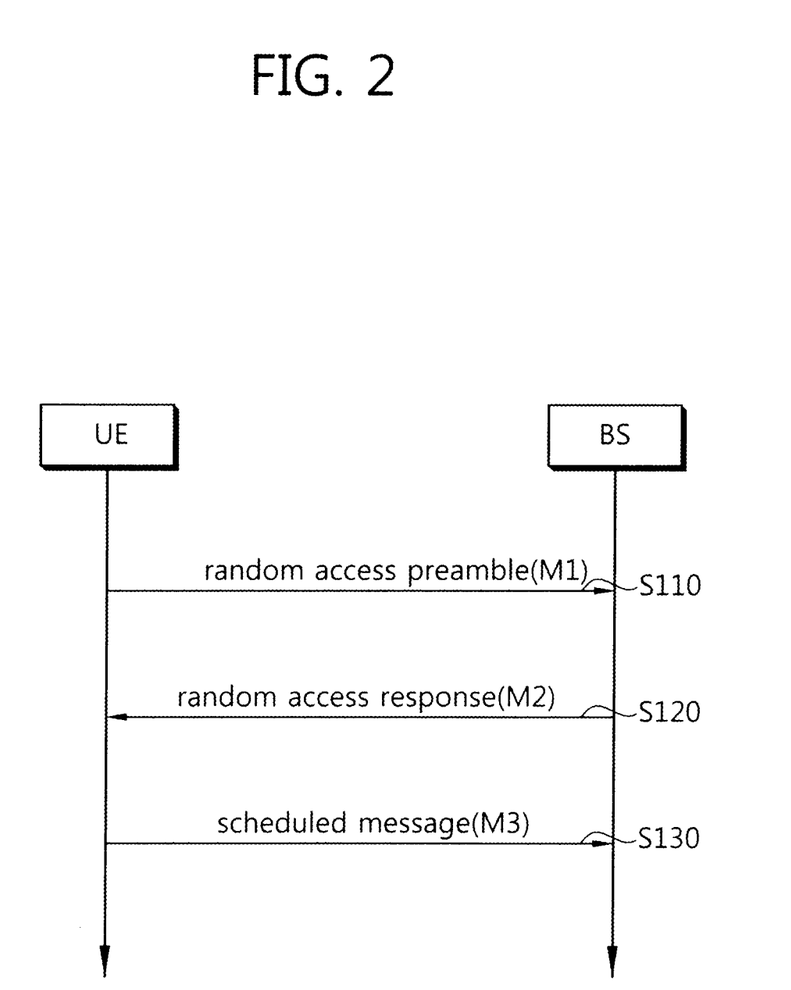
FIG. 2 is a flowchart showing a random access procedure in 3GPP LTE.

FIG. 2 is a flowchart showing a random access procedure in 3GPP LTE. The random access procedure is used by a UE to acquire a UL time alignment with a BS or to allocate a UL radio resource.

The UE receives a root index and a physical random access channel (PRACH) configuration index from the BS. Each cell has 64 candidate random access preambles defined by a Zadoff-Chu (ZC) sequence. The root index is a logical index for generating the 64 candidate random access preambles by the UE.

The random access preamble is limited to a specific time and frequency resource for each cell. The PRACH configuration index indicates a specific subframe and preamble format capable of transmitting the random access preamble.

The UE transmits a randomly selected random access preamble to the BS (step S110). The UE selects one of the 64 candidate random access preambles. In addition, the UE selects a corresponding subframe by using the PRACH configuration index. The UE transmits the selected random access preamble in the selected subframe.

Upon receiving the random access preamble, the BS transmits a random access response (RAR) to the UE (step S120). The RAR is detected in two steps. First, the UE detects a PDCCH masked with a random access-RNTI (RA-RNTI). The UE receives the RAR included in a medium access control (MAC) protocol data unit (PDU) through a PDSCH indicated by the detected PDCCH.

Figure 3:
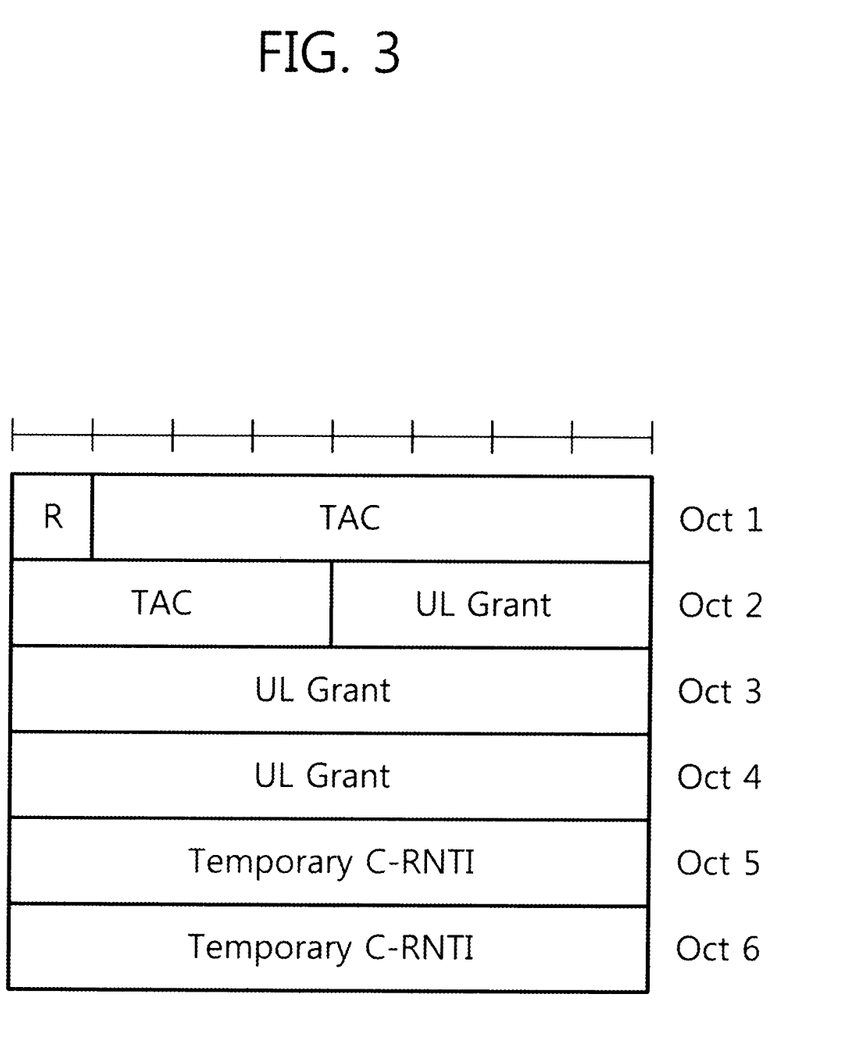
FIG. 3 shows an example of a random access response.

FIG. 3 shows an example of a random access response (RAR).

The RAR may include a TAC, a UL grant, and a temporary C-RNTI.

The TAC is information indicating a time alignment value sent by a BS to a UE to maintain a UL time alignment. The UE updates UL transmission timing by using the time alignment value. When the UE updates the time alignment, a time alignment timer starts or restarts.

The UL grant includes a UL resource assignment and a transmit power command (TPC) used to transmit a scheduling message described below. The TPC is used to determine transmit power for a scheduled PUSCH.

Referring back to FIG. 2, the UE transmits a scheduled message to the BS according to a UL grant included in the RAR (step S130).

Now, a multiple carrier system will be described.

A 3GPP LTE system supports a case in which a DL bandwidth and a UL bandwidth are differently configured under the premise that one component carrier (CC) is used. The 3GPP LTE system supports up to 20 MHz, and the UL bandwidth and the DL bandwidth may be different from each other. However, only one CC is supported in each of UL and DL cases.

Spectrum aggregation (or also referred to as bandwidth aggregation or carrier aggregation) supports multiple CCs. For example, if 5 CCs are assigned as a granularity of a carrier unit having a bandwidth of 20 MHz, a bandwidth of up to 100 MHz can be supported.

One DL CC or a pair of a UL CC and a DL CC can be mapped to one cell. Therefore, when a UE communicates with a BS through multiple CCs, it can be said that the UE receives a service from multiple serving cells.

Figure 4:
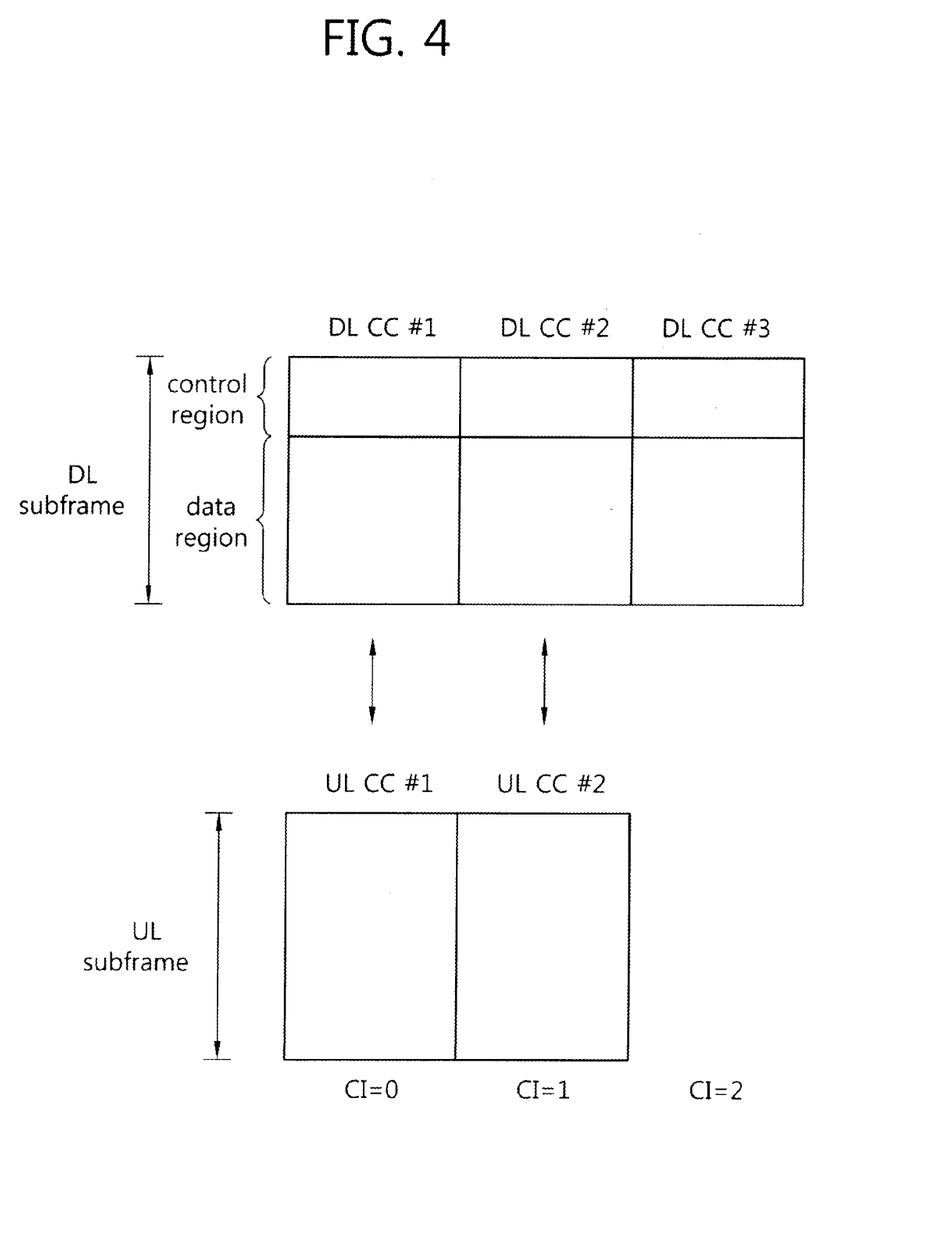
FIG. 4 shows an example of multiple carriers.

FIG. 4 shows an example of multiple carriers.

Although 3 DL CCs and 3 UL CCs are shown herein, the number of DL CCs and the number of UL CCs are not limited thereto. A PDCCH and a PDSCH are independently transmitted in each DL CC. A PUCCH and a PUSCH are independently transmitted in each UL CC. Since 3 DL CC-UL CC pairs are defined, it can be said that a UE receives a service from 3 serving cells.

The UE may monitor the PDCCH in multiple DL CCs, and may receive a DL transport block simultaneously via the multiple DL CCs. The UE may transmit multiple UL transport blocks simultaneously via multiple UL CCs.

It is assumed that a pair of a DL CC #1 and a UL CC #1 is a $1^{st}$ serving cell, a pair of a DL CC #2 and a UL CC #2 is a $2^{nd}$ serving cell, and a DL CC #3 is a $3^{rd}$ serving cell. Each serving cell can be identified by using a cell index (CI). The CI may be cell-specific or UE-specific. Herein, CI=0, 1, 2 are assigned to the $1^{st}$ to $3^{rd}$ serving cells for example.

The serving cell can be classified into a primary cell (or pcell) and a secondary cell (or scell). The primary cell operates at a primary frequency, and is a cell designated as the primary cell when the UE performs an initial network entry process or starts a network re-entry process or performs a handover process. The primary cell is also called a reference cell. The secondary cell operates at a secondary frequency. The secondary cell may be configured after an RRC connection is established, and may be used to provide an additional radio resource. At least one primary cell is configured always. The secondary cell may be added/modified/released by using higher-layer signaling (e.g., RRC messages).

The CI of the primary cell may be fixed. For example, a lowest CI may be designated as a CI of the primary cell. It is assumed hereinafter that the CI of the primary cell is 0 and a CI of the secondary cell is allocated sequentially starting from 1.

The UE may monitor a PDCCH through multiple serving cells. However, even if there are N serving cells, a BS may be configured to monitor the PDCCH for M (M≤N) serving cells. In addition, the BS may be configured to preferentially monitor the PDCCH for L (L≤M≤N) serving cells.

In the conventional 3GPP LTE, even if the UE supports multiple CCs, one timing alignment (TA) value is commonly applied to the multiple CCs. However, a propagation property may change since the multiple CCs are spaced apart from each other to a great extent in a frequency domain. For example, a remote radio header (RRH) and devices may exist in an area of the BS to extend a coverage or to remove a coverage hole.

Figure 5:
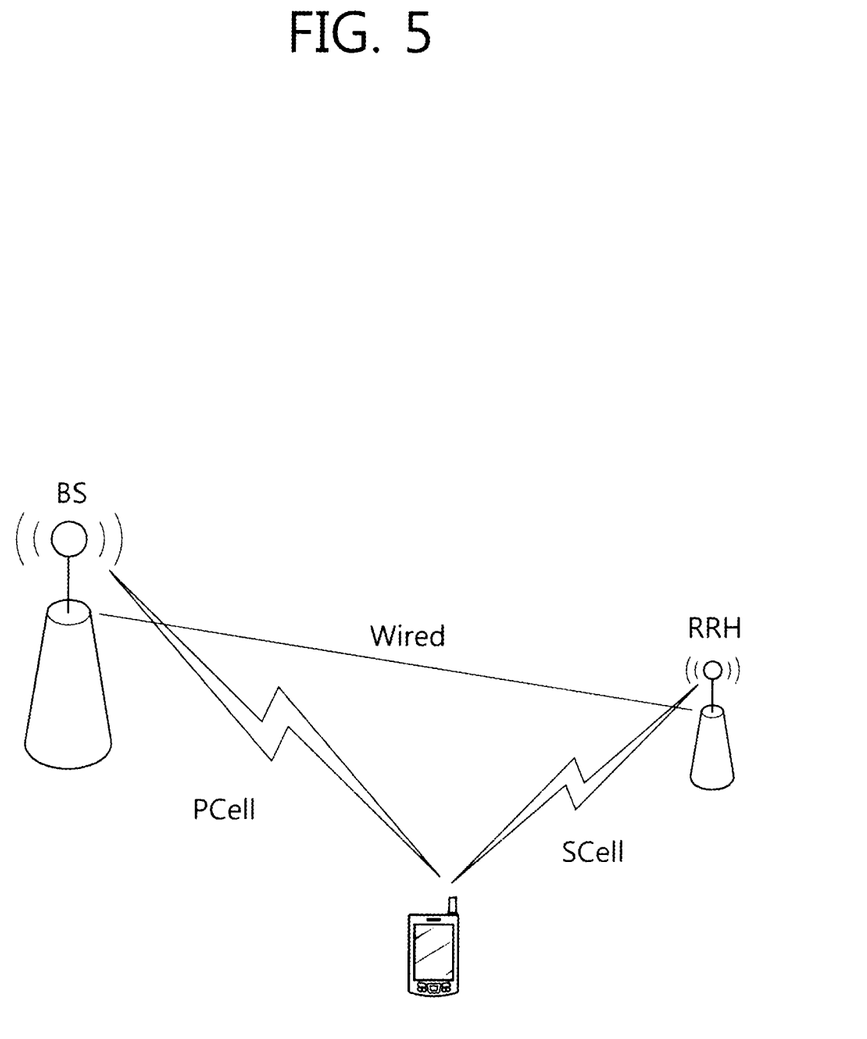
FIG. 5 shows an uplink (UL) propagation difference among multiple cells.

FIG. 5 shows a UL propagation difference among multiple cells.

A UE is served by a primary cell and a secondary cell. The primary cell provides a service by using a BS, and the secondary cell provides a service by using an RRH coupled to the BS. A propagation delay property of the primary cell may be different from a propagation delay property of the secondary cell due to a distance between the BS and the RRH, a processing time of the RRH, etc.

In this case, if the same TA value is applied to the primary cell and the secondary cell, it may have a significant effect on a time alignment of a UL signal.

Figure 6:
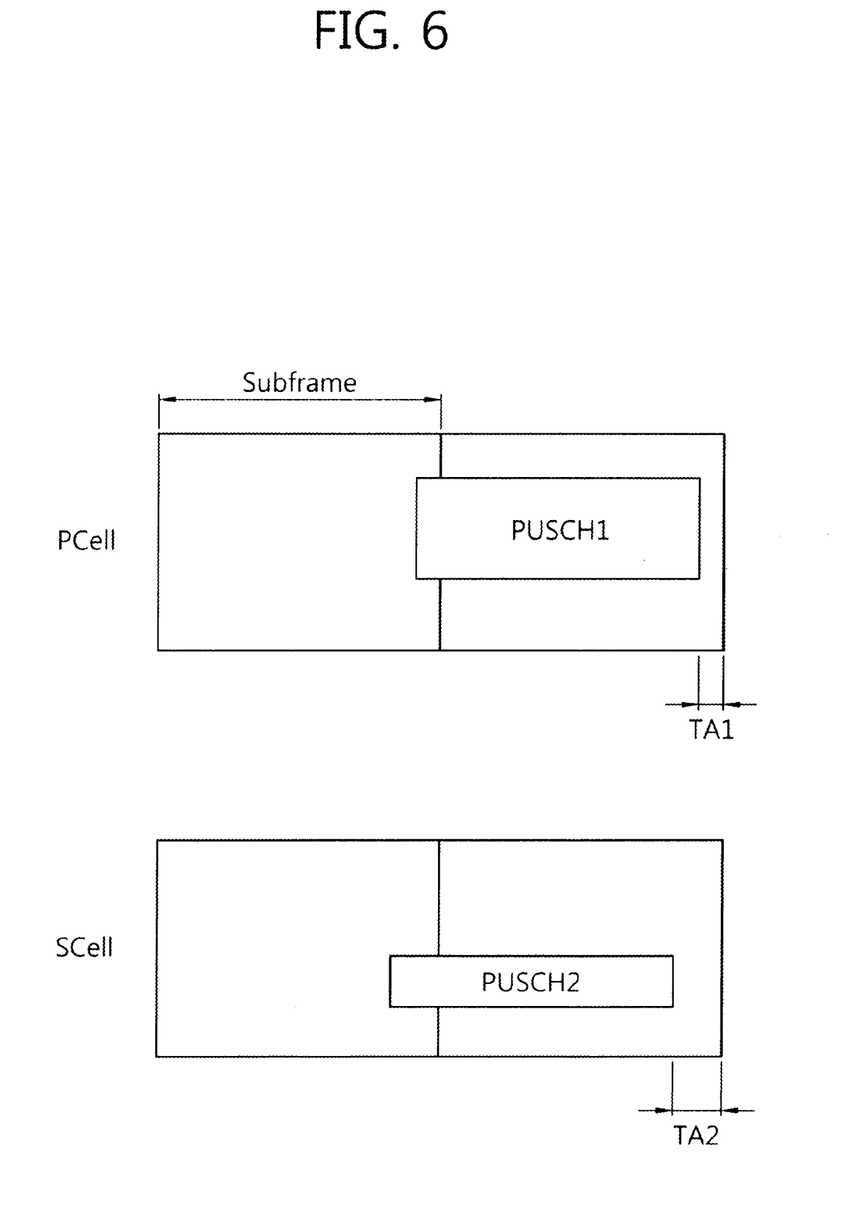
FIG. 6 shows an example in which a timing alignment (TA) varies among multiple cells.

FIG. 6 shows an example in which a TA varies among multiple cells in uplink transmission.

An actual TA of a primary cell is 'TA 1', and an actual TA of a secondary TA is 'TA 2'. Therefore, it is necessary to apply an independent TA for each serving cell.

To apply the independent TA, a TA group is defined. The TA group includes one or more cells to which the same TA is applied. The TA is allocated for each TA group, and a time alignment timer runs for each TA group.

Hereinafter, two serving cells, i.e., a first serving cell and a second serving cell, are considered, and it is assumed that the first serving cell belongs to a first TA group, and the second serving cell belongs to a second TA group. The number of serving cells and TA groups are for exemplary purposes only. The first serving cell may be the primary cell or the secondary cell, and the second serving cell may be the primary cell or the secondary cell.

The TA group may include at least one serving cell. Information regarding the configuration of the TA group may be reported by a BS to a UE.

Figure 7:
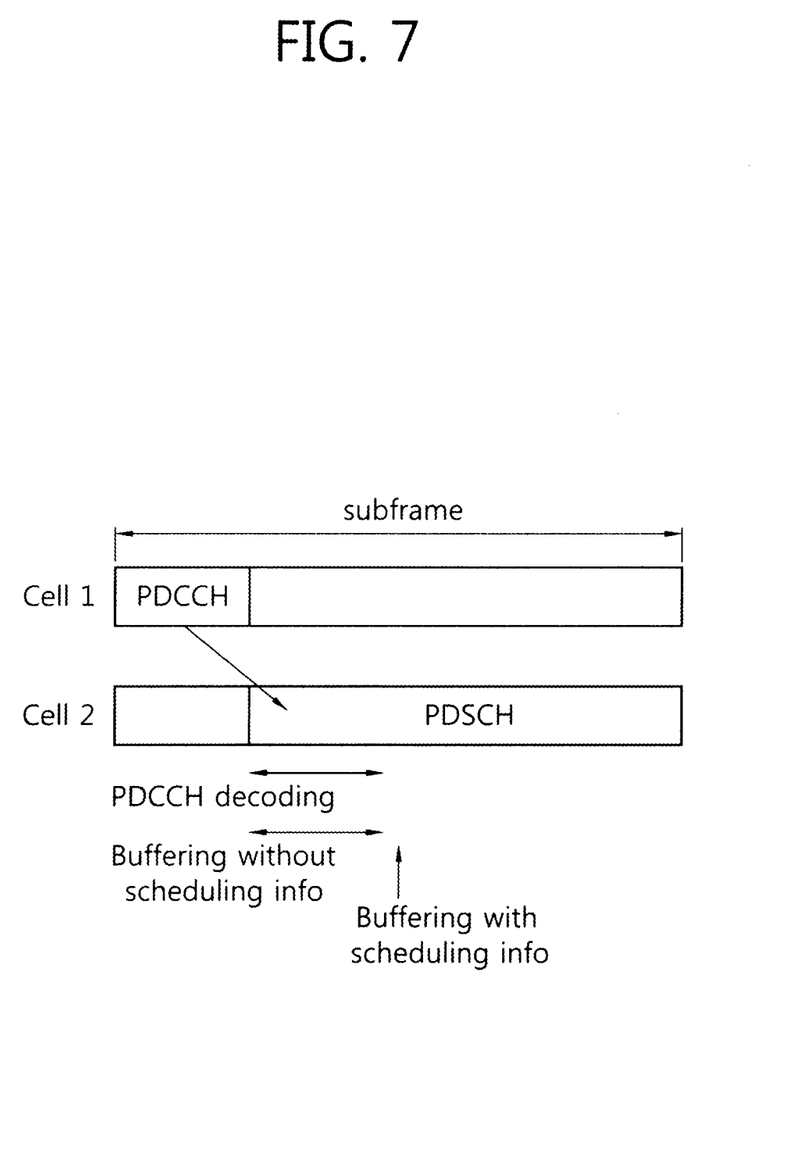
FIG. 7 shows an example of cross-scheduling in DL transmission.

FIG. 7 shows an example of cross-scheduling in downlink transmission. When a plurality of serving cells are configured, a PDCCH may schedule a PDSCH of another cell. This is called cross-scheduling. Assume that a PDCCH is transmitted in a cell 1, and a PDSCH related to the PDCCH is transmitted in a cell 2. A DL grant on the PDCCH may include a cell index indicating the cell 2 and a DL resource allocation for the PDSCH.

The cell 1 and the cell 2 have the same DL reception timing. Although it may differ according to an implementation of a UE, since the UE cannot know a specific frequency/time domain of a subframe and a specific modulation and coding scheme (MCS) to be used during a received PDCCH is decoded in the subframe, a soft-level symbol is received in a receiving buffer with respect to all regions in which the PDSCH can be transmitted to the UE. When PDCCH decoding is finished and scheduling information (i.e., DL grant) regarding a PDSCH scheduled to the UE is acquired during the PDSCH is received in the buffer, the UE may start to store a PDSCH symbol to the buffer only for a region in which the PDSCH is scheduled. Information stored in this case may also be further simplified by considering a scheduled MCS.

However, reception timing may not be identical among serving cells due to a propagation difference.

Figure 8:
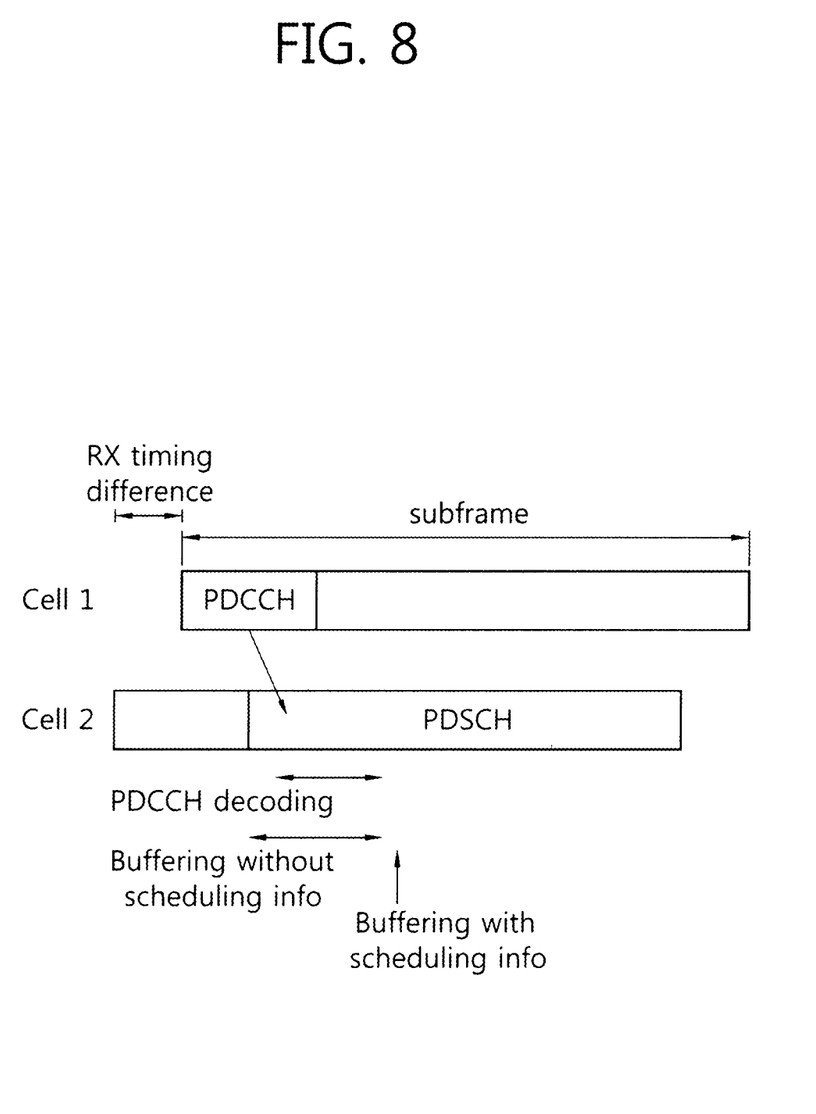
FIG. 8 shows an example of DL transmission based on different reception timing.

FIG. 8 shows an example of DL transmission based on different reception timing.

A UE schedules a PDSCH of a cell 2 through a PDCCH of a cell 1. Subframe reception timing of the cell 2 is faster than subframe reception timing of the cell 1.

In comparison with the example of FIG. 7, an amount of PDSCH symbols to be buffered by the UE without scheduling information until the PDCCH decoding is complete may be much greater, which may result in a great overhead in an implementation of the UE.

Hereinafter, methods for reducing a PDSCH buffering overhead of a wireless device are proposed when reception timing is different among a plurality of serving cells.

It is assumed hereinafter that there are two serving cells, each of which belongs to a different TA group. This is for exemplary purposes only, and thus the number of serving cells is not limited thereto. A first serving cell may be a primary cell, and a second serving cell may be a secondary cell.

Figure 9:
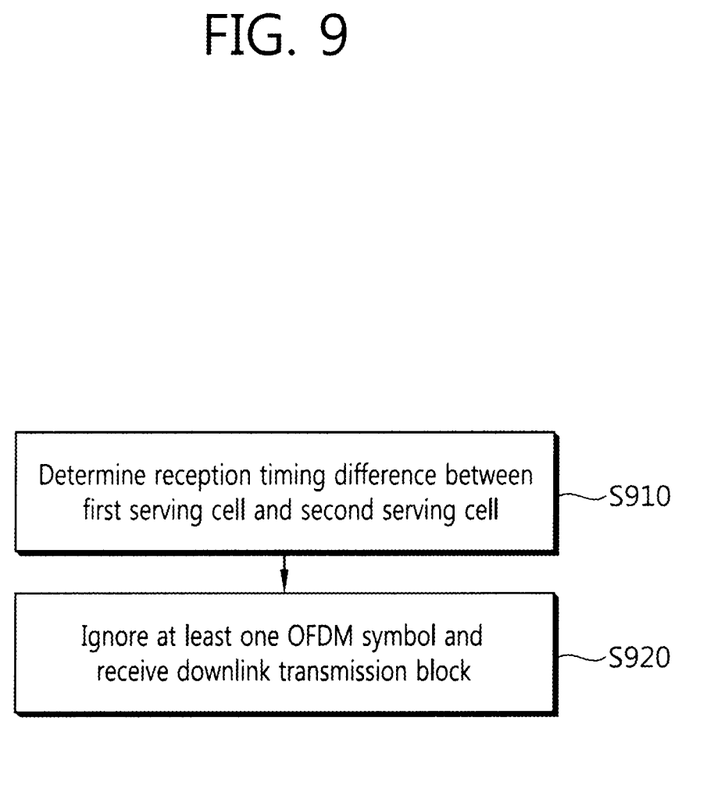
FIG. 9 is a flowchart showing a method of receiving downlink data according to an embodiment of the present invention.

FIG. 9 is a flowchart showing a method of receiving downlink data according to an embodiment of the present invention.

In step S910, a wireless device determines a difference of reception timing between a first serving cell and a second serving cell. The reception timing may be based on various units, such as a subframe, a slot, a frame, etc. Hereinafter, subframe reception timing is taken into account.

In step S920, if the reception timing difference is greater than a specific value, at least one OFDM symbol is neglected, and a downlink transport block is received. Assume that a downlink grant is received through a PDCCH of the first serving cell, and the downlink transport block is received through a PDSCH of the second serving cell indicated by the downlink grant. If a subframe reception timing difference is greater than the specific value, at least one OFDM symbol in a subframe in which the PDSCH is received may be neglected.

The specific value may be pre-defined, or may be given by a BS.

The wireless device may neglect one or more OFDM symbols in the subframe in which the PDSCH is received, and may perform PDSCH decoding on the remaining OFDM symbols. Therefore, the wireless device may reduce a buffering overhead by not buffering the neglected OFDM symbol.

The neglected OFDM symbol may be a first OFDM symbol of the subframe. Alternatively, the neglected OFDM symbol may be a first OFDM symbol in which a PDSCH region of the subframe starts.

Whether the wireless device will neglect a first OFDM symbol of a PDSCH or how many OFDM symbols will be neglected may be configured by the BS to the wireless device through RRC/MAC signaling. This configuration may be given for each cell or for each TA group.

The wireless device may determine whether to neglect a first symbol(s) of a PDSCH on the basis of a reception timing difference between a cell in which a PDCCH is received and a cell in which a PDSCH is scheduled and/or how many symbols will be neglected, according to a predetermined rule or in an arbitrary manner.

The BS may not transmit the neglected OFDM symbols. In this case, the wireless device may assume that a neglected OFDM symbol of a corresponding PDSCH is not transmitted. The BS may configure a bit combination constituting a PDSCH under the assumption that the PDSCH is transmitted in the neglected OFDM symbol, and thereafter may not transmit the neglected OFDM symbol. Alternatively, the BS may transmit the PDSCH by configuring a bit combination constituting a PDSCH except for the neglected OFDM symbols.

In another embodiment, the BS may report an OFDM symbol in which the PDSCH starts (this is called a start OFDM symbol). To decrease a PDSCH reception buffering overhead of the wireless device, a PDSCH transmission/reception start point may be adjusted in a subframe.

In general, the start OFDM symbol is a next OFDM symbol of a control region, that is, a $4^{th}$ OFDM symbol. The BS may adjust the start OFDM symbol to a $5^{th}$ OFDM symbol or a $6^{th}$ OFDM symbol through signaling.

When the start OFDM symbol that can be signaled is ranged from an $(s1)^{th}$ symbol to an $(s2)^{th}$ symbol, the following methods may be applied.

First, the range of the start OFDM symbol may be adjusted from s1+N1 to s2+N2. N may be predetermined or may be configured through RRC/MAC signaling. N1 and N2 may be 1 in particular, and may be defined as the same parameter N rather than separate parameters. Optionally, the start OFDM symbol in which PDSCH decoding starts in a subframe may be moved such that the symbol starts slower than a typical case, thereby decreasing a buffering overhead of the wireless device.

Second, a maximum value s2 of the start OFDM symbol may be adjusted to s2+N. N may be predetermined or may be configured through RRC/MAC signaling. N may be 1 in particular.

Third, the BS may adjust a minimum value s1 of the start OFDM symbol to s1+N. N may be predetermined or may be configured through RRC/MAC signaling. N may be 1 in particular.

Fourth, the wireless device may assume that the minimum value of the start OFDM symbol is s1+N. The wireless device may assume that the minimum value of the start OFDM symbol is s1+N (i.e., a value greater than s1). N may be predetermined value. N may be determined differently according to a timing difference. Herein, a cell in which a PDSCH is transmitted has faster timing than a cell in which a PDCCH for scheduling the PDSCH is transmitted. N may be 1 in particular.

Fifth, it is assumed that the start OFDM symbol is s2 between the BS and the wireless device. When cross-scheduling is configured among a plurality of cells (or TA groups), it may be assumed that the start OFDM symbol is s2 with respect to a cell in which a PDSCH is transmitted. In particular, s2 may be 4 (or 5).

The aforementioned methods may be applied in unit of a cell or a TA group. The methods may be applied when the cell in which the PDCCH is transmitted differs from the cell in which the PDSCH is transmitted, in particular, when subframe reception timing of the cell in which the PDCCH is transmitted is slower than that of the cell in which the PDSCH is transmitted.

In the aforementioned methods, N1, N2, and N may be integers greater than 0. N1, N2, and N may be determined according to a reception timing difference. N1, N2, and N may denote the minimum number of OFDM symbols corresponding to a time duration greater than or equal to a time difference by which subframe reception timing of the cell in which the PDSCH is transmitted is faster than reception timing of the cell in which the PDCCH is transmitted.

For another embodiment, cross-scheduling may be prohibited between different TA groups.

To avoid a case in which subframe reception timing is significantly different between the cell in which the PDCCH is transmitted and the cell in which the PDSCH is transmitted, cross-scheduling may be prohibited between different TA groups, and the cross-scheduling may be allowed between cells belonging to the same TA group.

A cell having slow reception timing may be prohibited to schedule a PDSCH of a cell faster than that. The cell having slow reception timing may not transmit a PDCCH for scheduling a PDSCH of another cell. If a reception timing difference of two cells is greater than a specific value, cross-scheduling may be prohibited.

A TA group having slow reception timing may be prohibited to schedule a PDSCH of a TA group faster than that. The TA group having slow reception timing may not transmit a PDCCH for scheduling a PDSCH of another TA group. If a reception timing difference of two TA groups is greater than a specific value, cross-scheduling may be prohibited.

The wireless device may report to the BS a reception timing difference among the plurality of cells. A relative reception timing difference may be reported, or whether reception timing of a specific cell is faster or slower than reception timing of another cell may be reported. The wireless device may report to the BS a reception timing difference between the cell in which the PDCCH is transmitted and the cell in which the PDSCH is transmitted.

The wireless device may report to the BS a reception timing difference among a plurality of TA groups. A relative reception timing difference may be reported, or whether reception timing of a TA group is faster or slower than reception timing of another TA group may be reported. The wireless device may report to the BS a reception timing difference between the TA group in which the PDCCH is transmitted and the TA group in which the PDSCH is transmitted. Alternatively, the wireless device may perform the reporting only when the reception timing difference among the plurality of cells or TA groups is greater than or equal to a specific value.

Figure 10:
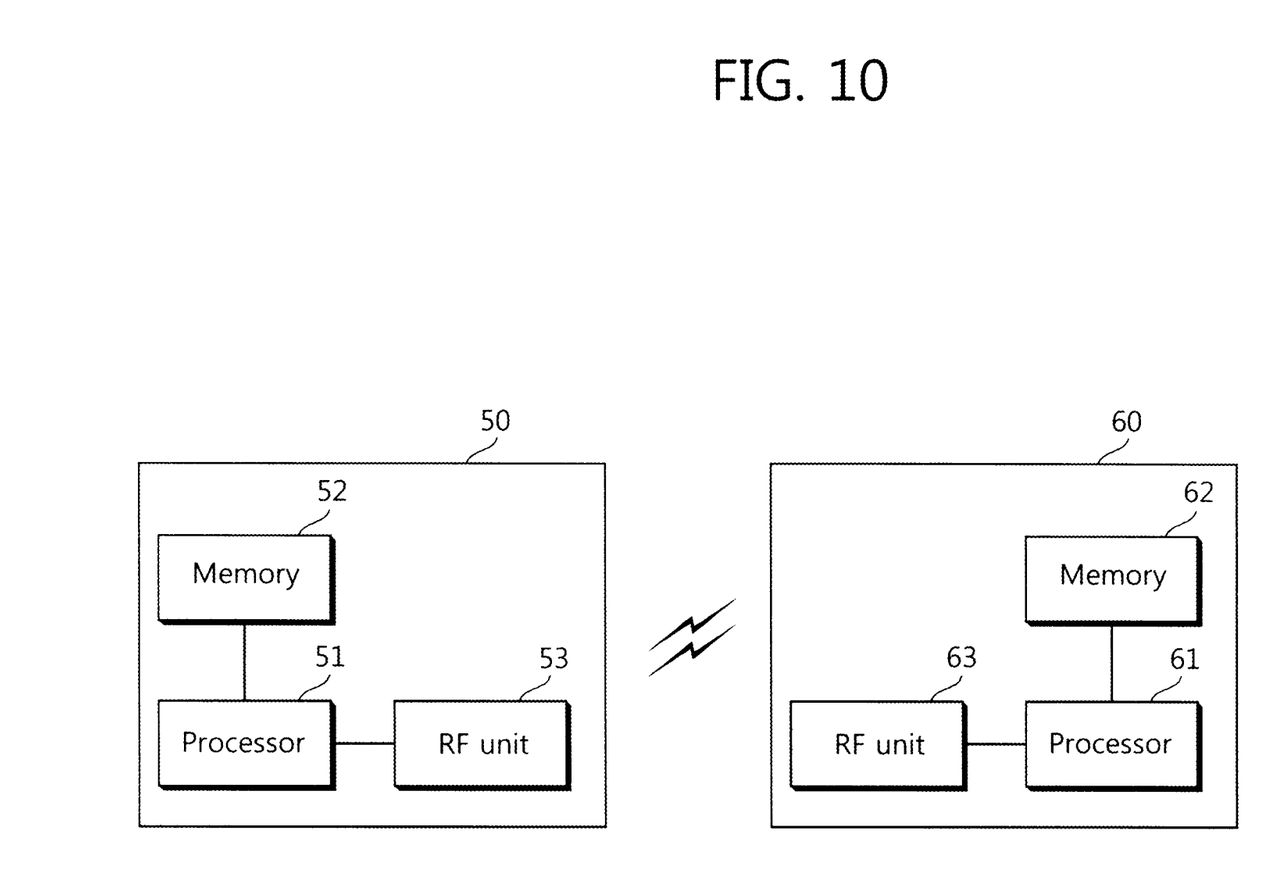
FIG. 10 is a block diagram showing a wireless communication system according to an embodiment of the present invention.

FIG. 10 is a block diagram showing a wireless communication system according to an embodiment of the present invention.

A BS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal. The processor 51 implements the proposed functions, procedures, and/or methods. In the aforementioned embodiment, a serving cell and/or a TA group may be controlled/managed by the BS, and an operation of one or more cells may be implemented by the processor 51.

A wireless device 60 includes a processor 61, a memory 62, and an RF unit 63. The memory 62 is coupled to the processor 61, and stores a variety of information for driving the processor 61. The RF unit 63 is coupled to the processor 61, and transmits and/or receives a radio signal. The processor 61 implements the proposed functions, procedures, and/or methods. In the aforementioned embodiment, an operation of the wireless device may be implemented by the processor 61.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a baseband circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A method of receiving downlink data in a wireless communication system, the method comprising:
   determining, by a wireless device, a subframe reception timing difference between a first serving cell and a second serving cell;
   receiving, by the wireless device, a downlink grant through a downlink control channel of the first serving cell;
   receiving, by the wireless device, a downlink transport block through a downlink shared channel of the second serving cell indicated by the downlink grant,
   wherein if the subframe reception timing difference is greater than a specific value, at least one orthogonal frequency division multiplexing (OFDM) symbol is ignored among a plurality of OFDM symbols in a subframe in which the downlink shared channel is received, and
   decoding the downlink shared channel in a number of the plurality of OFDM symbols which excludes the at least one ignored OFDM symbol,
   wherein a total number of ignored OFDM symbols among the plurality of OFDM symbols is determined based on the subframe reception timing difference value.

2. The method of claim 1, wherein the ignored OFDM symbol is a first OFDM symbol among the plurality of OFDM symbols.

3. The method of claim 1, wherein the subframe includes a control region and a data region, and the ignored OFDM symbol is a first OFDM symbol among OFDM symbols included in the data region.

4. The method of claim 1, wherein the downlink grant includes a cell index of the second serving cell.

5. The method of claim 1, wherein the downlink control channel is a physical downlink control channel (PDCCH), and the downlink shared channel is a physical downlink shared channel (PDSCH).

6. The method of claim 1, wherein the specific value is given by a base station.

7. The method of claim 1, wherein the first serving cell and the second serving cell belong to different timing advance (TA) groups.

8. A wireless device for receiving downlink data in a wireless communication system, the wireless device comprising:
   a processor configured to:
   determine a subframe reception timing difference between a first serving cell and a second serving cell;
   receive a downlink grant through a downlink control channel of the first serving cell;
   receive a downlink transport block through a downlink shared channel of the second serving cell indicated by the downlink grant,
   wherein if the subframe reception timing difference is greater than a specific value, at least one orthogonal frequency division multiplexing (OFDM) symbol is ignored among a plurality of OFDM symbols in a subframe in which the downlink shared channel is received; and
   decode the downlink shared channel in a number of the plurality of OFDM symbols which excludes the at least one ignored OFDM symbol, and
   wherein a total number of ignored OFDM symbols among the plurality of OFDM symbols is determined based on the subframe reception timing difference value.

9. The wireless device of claim 8, wherein the ignored OFDM symbol is a first OFDM symbol among the plurality of OFDM symbols.

10. The wireless device of claim 8, wherein the subframe includes a control region and a data region, and the ignored OFDM symbol is a first OFDM symbol among OFDM symbols included in the data region.

11. The wireless device of claim 8, wherein the downlink grant includes a cell index of the second serving cell.

12. The wireless device of claim 8, wherein the downlink control channel is a physical downlink control channel (PDCCH), and the downlink shared channel is a physical downlink shared channel (PDSCH).

* * * * *